US012339176B2

(12) United States Patent
Wu

(10) Patent No.: US 12,339,176 B2
(45) Date of Patent: Jun. 24, 2025

(54) ELECTRONIC DEVICE AND METHOD FOR MORE ACCURATELY ESTIMATING RESISTANCE VALUE OF THERMISTOR

(71) Applicant: PixArt Imaging Inc., Hsin-Chu (TW)

(72) Inventor: Yi-Hsuan Wu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 456 days.

(21) Appl. No.: 17/875,437

(22) Filed: Jul. 28, 2022

(65) Prior Publication Data

US 2024/0035900 A1 Feb. 1, 2024

(51) Int. Cl.
*G01K 7/24* (2006.01)
*G01K 7/42* (2006.01)

(52) U.S. Cl.
CPC .............. *G01K 7/24* (2013.01); *G01K 7/42* (2013.01); *G01K 2219/00* (2013.01)

(58) Field of Classification Search
CPC ......... G01K 7/24; G01K 7/42; G01K 2219/00
See application file for complete search history.

(56) References Cited

U.S. PATENT DOCUMENTS

| | | | | |
|---|---|---|---|---|
| 2014/0340100 A1* | 11/2014 | Popa | ..................... | G01R 27/00 324/691 |
| 2014/0355650 A1* | 12/2014 | Hong | ..................... | G01K 7/22 374/170 |
| 2015/0219503 A1* | 8/2015 | Yoshida | ................... | G01K 7/24 374/170 |
| 2017/0318786 A1* | 11/2017 | Pinder | .................. | A01K 1/0107 |
| 2022/0065709 A1* | 3/2022 | Li | ............................. | G01K 7/24 |
| 2022/0146329 A1* | 5/2022 | Hunter | ..................... | G01K 7/24 |
| 2022/0158164 A1* | 5/2022 | S. | .......................... | H01M 4/625 |

FOREIGN PATENT DOCUMENTS

| CN | 112747830 A | * | 5/2021 | ............ G01K 13/00 |
|---|---|---|---|---|
| WO | WO-2020065694 A1 | * | 4/2020 | ............ H03M 1/007 |
| WO | WO-2021085808 A1 | * | 5/2021 | ........... G01K 15/007 |

* cited by examiner

*Primary Examiner* — Laura Martin
*Assistant Examiner* — Julia Fitzpatrick
(74) *Attorney, Agent, or Firm* — Winston Hsu

(57) ABSTRACT

An electronic device for estimating a temperature value of a thermistor includes a first signal port, an analog-to-digital converter, and a processing circuit. When the thermistor is coupled to the first signal port of the electronic device, the processing circuit is arranged to operate in a first switching condition to detect and generate a first voltage difference to the analog-to-digital converter, to operate in a second switching condition to detect and generate a second voltage difference to the analog-to-digital converter; and, the analog-to-digital converter is arranged to determine a resistance value of the thermistor based on the first voltage difference compared to the second voltage difference and to generate the estimated temperature value according to the determined resistance value.

14 Claims, 4 Drawing Sheets

ELECTRONIC DEVICE AND METHOD FOR MORE ACCURATELY ESTIMATING RESISTANCE VALUE OF THERMISTOR

BACKGROUND OF THE INVENTION

1. Field of the Invention

The invention relates to a thermistor readout mechanism, and more particularly to an electronic device and corresponding method.

2. Description of the Prior Art

Generally speaking, a thermistor unit/circuit has a resistance value which is configured to vary or change with a temperature or a variable working temperature wherein the temperature variation range supported by the thermistor may be a wider range such as −55° C. to +150° C. (but not limited), and a conventional readout circuit is merely used to read a resistance value of the thermistor to obtain a corresponding temperature value.

However, if the conventional readout circuit is implemented by using an integrated circuit chip and is used in a wider temperature range, the performance of the conventional readout circuit will be easily affected since variations will occur in the internal circuit component(s) comprised within the conventional readout circuit. In addition, manufacturer process variations in the internal circuit component(s) may be degrade the performance of the conventional readout circuit. The conventional readout circuit cannot accurately estimate the temperature of the thermistor.

SUMMARY OF THE INVENTION

Therefore one of the objectives of the invention is to provide readout circuit(s) and corresponding method(s) to solve the above-mentioned problems.

According to embodiments of the invention, an electronic device for estimating a temperature value of a thermistor is disclosed. The electronic device comprises a first signal port, an analog-to-digital converter, and a processing circuit. The first signal port is to be coupled to a first terminal of the thermistor. The processing circuit is disposed and coupled between the first signal port and the analog-to-digital converter. When the thermistor is coupled to the first signal port of the electronic device, the processing circuit is arranged to operate in a first switching condition to detect and generate a first voltage difference to the analog-to-digital converter, to operate in a second switching condition to detect and generate a second voltage difference to the analog-to-digital converter. The analog-to-digital converter is arranged to determine a resistance value of the thermistor based on the first voltage difference compared to the second voltage difference and to generate the estimated temperature value according to the determined resistance value.

According to the embodiments, a method of an electronic device for estimating a temperature value of a thermistor is disclosed. The method comprises: providing a first signal port, to be coupled to a first terminal of the thermistor; providing an analog-to-digital converter; providing a processing circuit, disposed and coupled between the first signal port and the analog-to-digital converter; when the thermistor is coupled to the first signal port of the electronic device, controlling the processing circuit to operate in a first switching condition to detect and generate a first voltage difference to the analog-to-digital converter, to operate in a second switching condition to detect and generate a second voltage difference to the analog-to-digital converter; and, using the analog-to-digital converter to determine a resistance value of the thermistor based on the first voltage difference compared to the second voltage difference and to generate the estimated temperature value according to the determined resistance value.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution and electronic devices such as readout circuits capable of accurately estimating or determining an impedance (or resistance value) of a thermistor circuit/unit to estimate a corresponding temperature value even though a variation such as a process variation and/or a voltage variation caused by a temperature variation (but not limited) may occur in the readout circuits. A thermistor has a variable resistance which is strongly dependent on a temperature. More specifically, a provided readout circuit can operate in a voltage mode or a current mode, and can be arranged to accurately estimate the variable resistance value of the thermistor by reading the resistance value of the thermistor two times so as to reduce the effect of a voltage variation caused by a temperature variation. In addition, the provided readout circuit can estimate the variance(s) of internal circuit component(s) comprised by the readout circuit to obtain the actual impedance (s) (or resistance (s)) of the internal circuit component (s) by reading the resistance value of an external reference impedance two times; for example, the readout circuit can estimate the process variation. In the following paragraphs, different embodiments are provided. It should be noted, an electronic device such as readout circuit for example is implemented by a single integrated circuit chip, and each resistor unit or each switch unit may be implemented by using a transistor circuit component; this is not intended to be a limitation.

Figure 1:
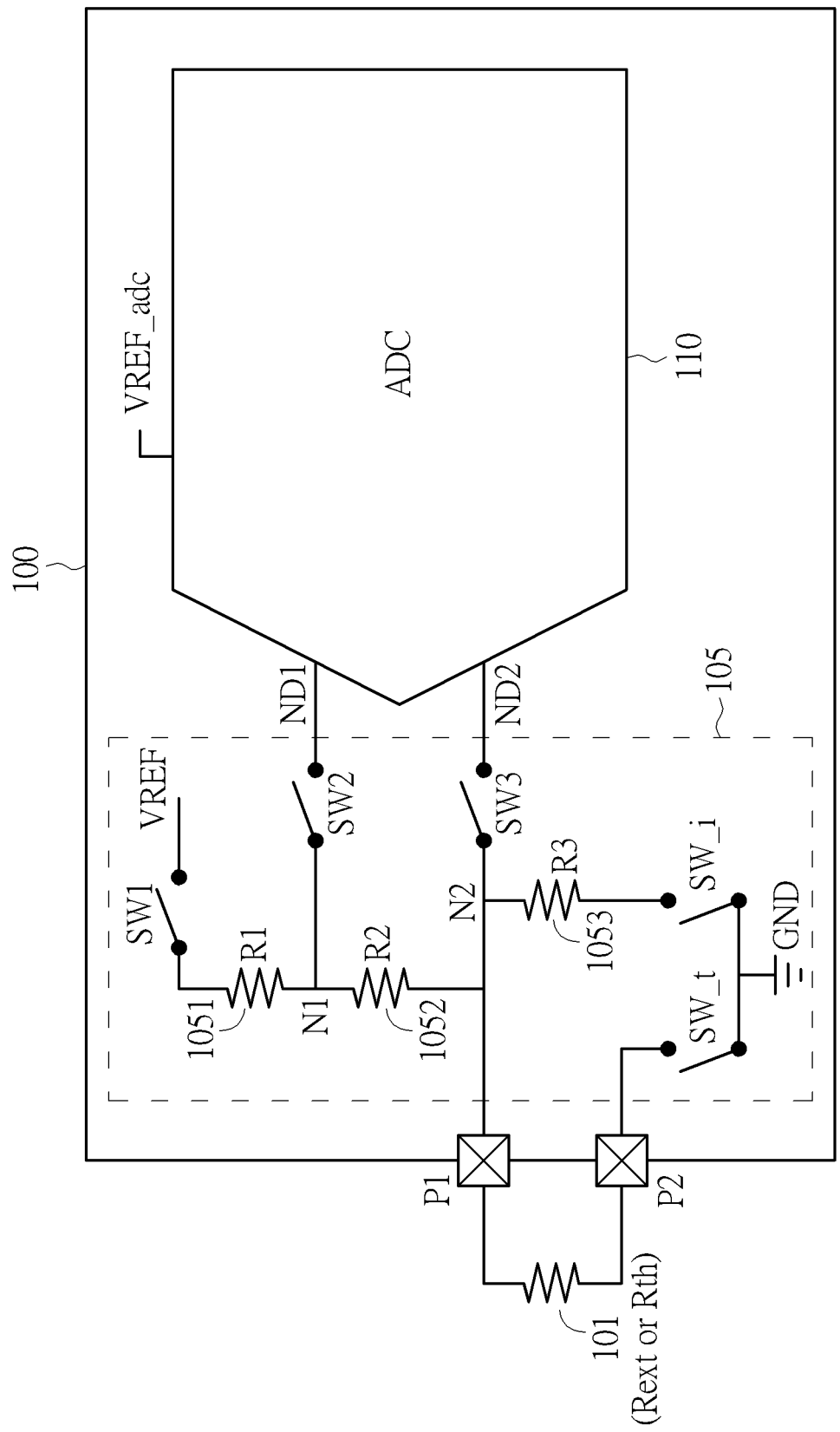
FIG. 1 is a circuit diagram of a readout circuit according to an embodiment of the invention.

FIG. 1 is a circuit diagram of an electronic device such as readout circuit 100 according to an embodiment of the invention. The readout circuit 100 is arranged to operate in a voltage mode and comprises two signal ports such as two pins/pads P1 and P2 in FIG. 1, an analog-to-digital converter (ADC) 110 such as a high dynamic input range ADC (HRADC), and a processing circuit 105 disposed between the pads P1 and P2 and the ADC 110. The readout circuit 100 is to be coupled to an external circuit component 101 through the pads P1 and P2, wherein the external circuit component 101 for example is a reference/external resistor unit having a reference and accurate resistance value Rext or may be a thermistor having a variable resistance value Rth which changes with a variable working temperature, as shown in FIG. 1. The processing circuit 105 comprises switch units SW1-SW3, resistor units 1051-1053 respectively having the resistance values R1-R3, and two switch units SW_i and SW_t. The intermediate nodes N1 and N2 of the processing circuit 105 are selectively coupled to the first differential input node ND1 and second differential input node ND2 of the ADC 110 through the switch units SW2 and SW3, respectively. The processing circuit 105 is powered by the reference voltage VREF through the switch unit SW1 and is arranged to operate in the voltage mode, and the ADC 110 is powered by the reference voltage VREF_adc which may be identical to or different from the reference voltage VREF.

In this embodiment, to obtain the actual resistance or impedance of the internal circuit component (s) of the readout circuit 100 under a condition that the process variation has occurred, the readout circuit 100 before leaving the manufacturer's factory can be coupled to a reference resistor unit having a reference and accurate resistance value Rext. That is, in this situation the external circuit component 101 is the reference resistor unit, and the two pads P1 and P2 of readout circuit 100 are to be coupled to two ends of the reference resistor unit having the reference resistance value Rext. When the readout circuit 100 is coupled to the reference resistor unit 101 having the resistance value Rext, the switch units SW1-SW3 become closed so that the processing circuit 105 can operate in the voltage mode to act as an intermediate readout circuit. The switch units SW1-SW3 become open when the pads P1 and P2 are disconnected from an external circuit component. The resistor unit 1051 is coupled between the first intermediate node N1 and the supply voltage VREF. The resistor unit 1052 is coupled between the first intermediate node N1 and the second intermediate node N2. The resistor unit 1053 is coupled between the second intermediate node N2 and the switch unit SW_i. The switch unit SW_i is controlled by the ADC 110 and selectively coupled between the resistor unit 1053 and the ground level GND. The switch unit SW_t is controlled by the ADC 110 and selectively coupled between the pad P2 (i.e. the second signal port) and the ground level GND.

To obtain the actual resistance or impedance of the internal circuit component(s) to reduce the process variation effect, the processing circuit 105 operates in a first switching condition in which the switch unit SW_i becomes closed and the switch unit SW_t becomes open, and thus the resistors units 1051, 1052, and 1053 respectively having the resistance values R1-R3 become connected in series between the supply voltage VREF and the ground level GND. Based on the respective resistance values R1-R3 and a voltage dividing operation/principle, the ADC 110 can detect and obtain a first voltage difference between its differential input nodes ND1 and ND2 (i.e. a voltage drop V1 (not shown in FIG. 1) across the resistor unit 1052 of the resistor units 1051, 1052, and 1053) and the ADC 110 can correspondingly convert the first voltage difference into a first digital signal such as a digital code D1.

Then, after the first digital signal D1 is generated, the ADC 110 can control the switch units SW_i and SW_t to make the processing circuit 105 operate in a second switching condition in which the switch unit SW_i becomes open and the switch unit SW_t becomes closed, and thus the resistors units 1051, 1052, and 101 become connected in series between the supply voltage VREF and the ground level GND. Based on the respective resistance values of the resistors units R1, R2, and Rext and the voltage dividing operation/principle, the ADC 110 can detect and obtain a second voltage difference between its differential input nodes ND1 and ND2 (i.e. a voltage drop V2 (not shown in FIG. 1) across the resistor unit 1052 of the resistor units 1051, 1052, and 101) and the ADC 110 can correspondingly convert the second voltage difference into a second digital signal such as a digital code D2. That is, the ADC 110 of readout circuit 100 is arranged to read and obtain two digital signals, i.e. reading signal two times.

After generating the second digital signal D2, the ADC 110 can accurately estimate the variation(s) of resistor units 1051-1053 based on the first and second digital signals D1 and D2 so as to obtain actual resistance values of resistor units 1051-1053. For example (but not limited), the accurate reference resistance value Rext may be configured to be identical to the target resistance value of resistor unit 1053, and ideally the first voltage difference (or the first digital signal D1) should be identical to the second voltage difference (or the second digital signal D2) mentioned above. Thus, when detecting a variation between the first and second voltage differences (or between the first and second digital signals D1 and D2), the ADC 110 can obtain a resistance variation of the resistor unit 1053 based on the detected variation between the first and second digital signals D1 and D2 so as to obtain and determine/estimate the actual resistance value R3. It should be noted that, in other embodiments, the resistance value Rext of the reference resistor unit may be designed and configured to be different from the target resistance value of resistor unit 1053; this is not meant to be a limitation. Further, it should be noted that the ADC 110 is arranged to obtain the actual resistance value R3 of resistor unit 1053 and it is not needed for the ADC 110 to calibrate the actual resistance value R3 of resistor unit 1053 to the target resistance value.

Further, after the readout circuit 100 leaves the factory, the readout circuit 100 is to be coupled to two terminals of a thermistor circuit/unit which may operate at a wider temperate range in which a voltage variation may occur in the supply voltage (s) VREF and/or VREF_adc. To reduce this effect, the readout circuit 100 is arranged to read and obtain two digital signals, i.e. reading signal two times. For example, in this situation, the external circuit component 101 is the thermistor having the actual resistance value Rth corresponding to a temperature value such as a variable working temperature. Similarly, the processing circuit 105 operates in a first switching condition in which the switch unit SW_i becomes closed and the switch unit SW_t becomes open, and thus the resistors units 1051, 1052, and 1053 are connected in series between the supply voltage VREF and the ground level GND. Based on the respective resistance values R1-R3 and the voltage dividing operation/ principle, the ADC 110 can also detect and obtain another first voltage difference between its differential input nodes ND1 and ND2 (i.e. a voltage drop V3 (not shown in FIG. 1) across the resistor unit 1052 of the resistor units 1051, 1052, and 1053) and the ADC 110 can correspondingly convert the first voltage difference into a first digital signal such as a digital code D3.

Then, after the first digital signal D3 is generated, the ADC 110 can control the switch units SW_i and SW_t to make the processing circuit 105 operate in a second switching condition in which the switch unit SW_i becomes open and the switch unit SW_t becomes closed, and thus the resistors units 1051, 1052, and thermistor 101 become connected in series between the supply voltage VREF and the ground level GND. Based on the respective resistance values of the resistors units R1, R2, and Rth and the voltage dividing operation/principle, the ADC 110 can detect and obtain another second voltage difference between its differential input nodes ND1 and ND2 (i.e. a voltage drop V4 (not shown in FIG. 1) across the resistor unit 1052 of the resistor units 1051, 1052, and thermistor 101) and it can correspondingly convert the second voltage difference into another second digital signal such as a digital code D4.

After generating the another second digital signal D4, the ADC 110 can accurately estimate the resistance value Rth of the thermistor based on the ratio change between the first and second digital signals D3 and D4 respectively corresponding to the voltage differences V3 and V4 even though a voltage variation, caused due to a significant temperature variation, may occur in the supply voltage VREF or VREF_adc. After obtaining the resistance value Rth, the ADC 110 is arranged to obtain a variable working temperature associated with the estimated resistance value Rth based on a mapping table (e.g. a look-up table) which records a relation between different variable working temperatures and different resistance values of the thermistor.

Figure 2:
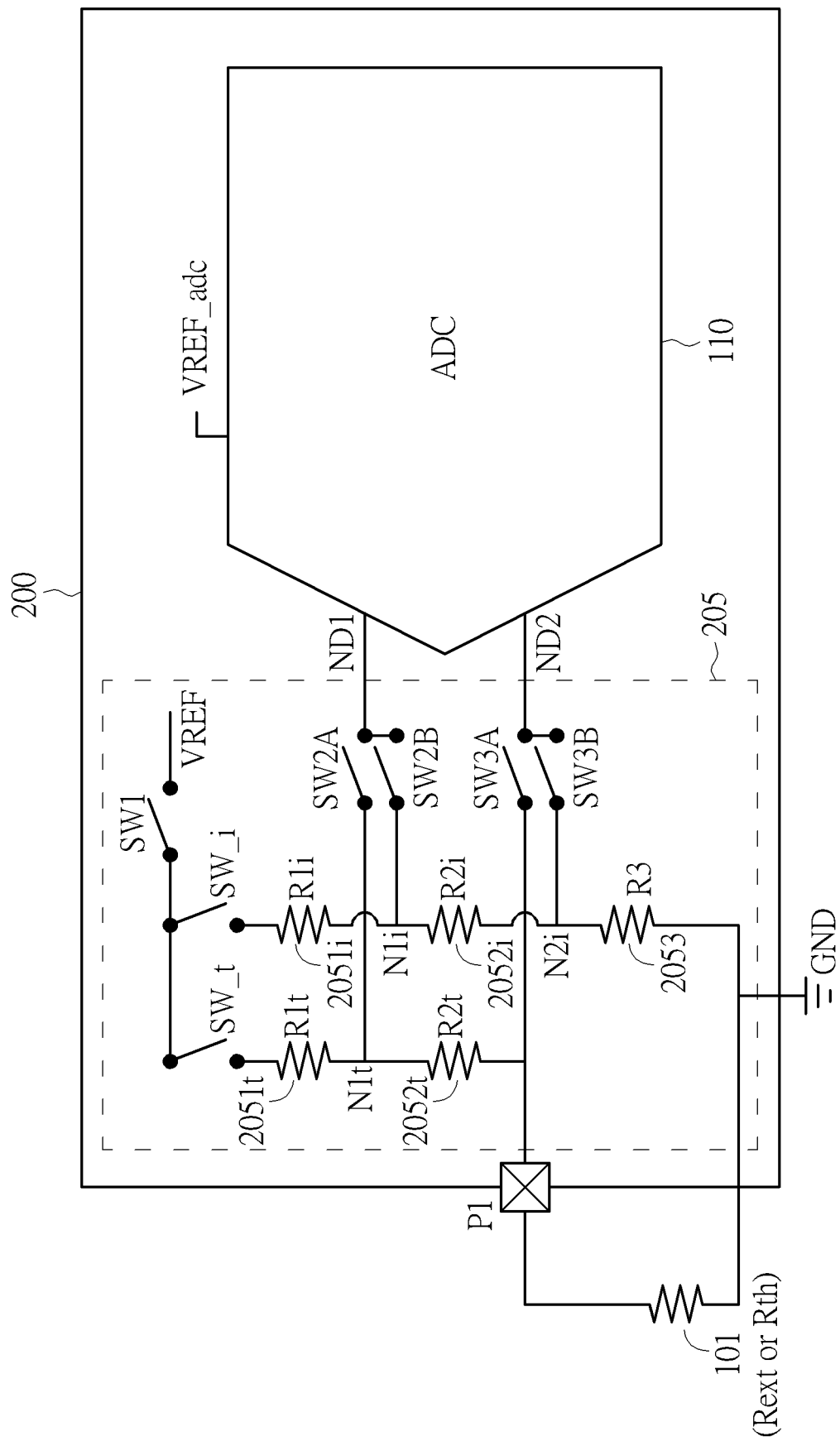
FIG. 2 is a circuit diagram of a readout circuit according to another embodiment of the invention.

In other embodiment, a processing circuit, coupled between the ADC 110 and the thermistor, may be coupled to only one signal port rather than two signal ports. FIG. 2 is a circuit diagram of an electronic device such as readout circuit 200 according to another embodiment of the invention. The readout circuit 200 comprises only one signal port such as a first signal port (e.g. a single pin or pad P1), the ADC 110 such as HRADC, and a processing circuit 205. The readout circuit 200 is to be coupled to the external circuit component 101 through the only one pad P1, wherein the external circuit component 101 for example is a reference/external resistor unit having the reference and accurate resistance value Rext or a thermistor having a variable resistance value Rth corresponding to a variable working temperature, as shown in FIG. 2. The processing circuit 205 comprises switch units SW1, SW2A, SW2B, SW3A, SW3B, resistor units 2051*i*, 2051*t*, 2052*i*, 2052*t*, 2053 respectively having the resistance values R1i, R1t, R2i, R2t, R3, and two switch units SW_i and SW_t.

The switch unit SW1 is controlled by the ADC 110 and selectively coupled between the supply voltage VREF and one end (e.g. a top end) of the switch unit SW_i or SW_t; the switch unit SW1 is closed when the thermistor or the external reference resistor unit is coupled to the pad P1 of readout circuit 200, and it is open when the connection relation is disconnected. The switch unit SW2A is also controlled by the ADC 110 and selectively coupled between the differential input node ND1 and an intermediate node N1t of the processing circuit 205, and the switch unit SW2B is controlled by the ADC 110 and selectively coupled between the differential input node ND1 and an intermediate node N1i of the processing circuit 205. The switch unit SW3A is also controlled by the ADC 110 and selectively coupled between the differential input node ND2 and an intermediate node N2t of the processing circuit 205, and the switch unit SW3B is controlled by the ADC 110 and selectively coupled between the differential input node ND2 and an intermediate node N2i of the processing circuit 205. That is, the differential input node ND1 can be coupled to one of the intermediate nodes N1i and N1t, and the differential input node ND2 can be coupled to one of the intermediate nodes N2i and N2t.

In addition, the processing circuit 105 is also powered by the reference voltage VREF through the switch unit SW1 to operate in a voltage mode, and the ADC 110 is powered by the reference voltage VREF_adc which may be identical to or different from the reference voltage VREF.

In this embodiment, similarly, to obtain the actual resistance or impedance of the internal circuit component(s) of the readout circuit 200 under a condition that the process variation has occurred, the readout circuit 200 before leaving the manufacturer's factory can be coupled to the reference resistor unit having the reference and accurate resistance value Rext. In this situation, the single one pad P1 of the readout circuit 200 is coupled to one end/terminal one end/terminal of the external resistor unit 101 having the reference resistance value Rext; another end or terminal of the external resistor unit 101 is coupled to the ground level GND. When the readout circuit 200 is coupled to the external resistor unit 101, the switch unit SW1 becomes closed so that the processing circuit 205 can operate in the voltage mode to act as an intermediate readout circuit. In FIG. 2, the resistor unit 2051*i* having the resistance value R1i is coupled between the intermediate node N1i and a bottom end of the switch unit SW_i, and the resistor unit 2051*t* having the resistance value R1t is coupled between the intermediate node N1t and a bottom end of the switch unit SW_t. The resistor unit 2052*i* having the resistance value R2i is coupled between the intermediate node N1i and the intermediate node N2i (i.e. one end of the resistor unit 2053 having the resistance value R3), and the resistor unit 2052*t* having the resistance value R2t is coupled between the intermediate node N1t and the intermediate node N2t (i.e. the pad Ph). The resistor unit 2053 is coupled between the intermediate node N2i, and the ground level GND. The switch unit SW_i is controlled by the ADC 110 and selectively coupled between the supply voltage VREF and the top end of the resistor unit 2051*i*, and the switch unit SW_t is controlled by the ADC 110 and selectively coupled between the supply voltage VREF and the top end of the resistor unit 2051*t*.

To obtain the actual resistance or impedance of the internal circuit component(s) to reduce the process variation effect, the processing circuit 205 operates in a first switching condition in which the switch unit SW_i becomes closed, the switch unit SW_t becomes open, the switch unit SW2A becomes open, the switch unit SW2B becomes closed, the switch unit SW3A becomes open, and the switch unit SW3B becomes closed, and thus the resistors units 2051*i*, 2052*i*, and 2053 are connected in series between the supply voltage VREF and the ground level GND. Based on the respective resistance values R1i, R2i, R3, and the voltage dividing operation/principle, the ADC 110 can detect and obtain a first voltage difference between its differential input nodes ND1 and ND2 (e.g. a voltage drop V5 (not shown in FIG. 2) across the resistor unit 2052*i* of the resistor units 2051*i*, 2052*i*, and 2053) and the ADC 110 can correspondingly convert the first voltage difference into a first digital signal such as a digital code D5.

Then, after the first digital signal D5 is generated, the ADC 110 can control the switch units SW_i, SW_t, SW2A, SW2B, SW3A, and SW3B to make the processing circuit 205 operate in a second switching condition in which the switch unit SW_i becomes open, the switch unit SW_t becomes closed, the switch unit SW2A becomes closed, the switch unit SW2B becomes open, the switch unit SW3A becomes closed, the switch unit SW3B becomes open, and thus the resistors units 2051*t*, 2052*t*, and 101 become connected in series between the supply voltage VREF and the ground level GND. Based on the respective resistance values of the resistors units R1t, R2t, Rext, and the voltage dividing operation/principle, the ADC 110 can detect and obtain a second voltage difference between its differential input nodes ND1 and ND2 (e.g. a voltage drop V6 (not shown in FIG. 2) across the resistor unit 2052t of the resistor units 2051t, 2052t, and 101) and the ADC 110 can correspondingly convert the second voltage difference into a second digital signal such as a digital code D6.

After generating the second digital signal D6, the ADC 110 can accurately estimate the variation(s) of resistor units comprised within the processing circuit 205 based on the first and second digital signals D5 and D6. For example (but not limited), the accurate reference resistance value Rext may be configured to be identical to the target resistance value of resistor unit 2053, and ideally the first voltage difference (or the first digital signal D5) should be identical to the second voltage difference (or the second digital signal D6) mentioned above. Thus, when detecting a variation between the first and second voltage differences (or between the first and second digital signals D5 and D6), the ADC 110 can obtain a resistance variation of the resistor unit 2053 based on the detected variation between the first and second digital signals D5 and D6 so as to obtain and determine/estimate the actual resistance value R3.

It should be noted that, in other embodiments, the resistance value Rext of the reference resistor unit may be designed and configured to be different from the target resistance value of resistor unit 2053; this is not meant to be a limitation. Further, it should be noted that the ADC 110 is arranged to obtain the actual resistance value R3 of resistor unit 2053 and it is not needed for the ADC 110 to calibrate the actual resistance value R3 of resistor unit 2053 to the target resistance value. Further, in this embodiment, the resistor unit 2051t having the resistance value R1t is for example a duplicate of the resistor unit 2051i having the resistance value R1i and the resistor unit 2052t having the resistance value R2t is for example a duplicate of the resistor unit 2052i having the resistance value R2i; that is, ideally the values of resistance values R1i and R1t are the same and the values of resistance values R2i and R2t are the same regardless of a process variation. The resistor unit 2051t is matched with the resistor unit 2051i, and the resistor unit 2052t is matched with the resistor unit 2052i.

Further, after the readout circuit 200 leaves the factory, the readout circuit 200 is to be coupled to two terminals of a thermistor circuit/unit which may operate at a wider temperate range in which a voltage variation may occur in the supply voltage (s) VREF and/or VREF_adc. Similarly, to reduce this effect, the readout circuit 200 is arranged to read and obtain two digital signals, i.e. reading signal two times. For example, the external circuit component 101 in this situation is the thermistor having the actual resistance value Rth corresponding to a variable working temperature. Similarly, the processing circuit 205 operates in the first switching condition in which the switch unit SW_i becomes closed, the switch unit SW_t becomes open, the switch unit SW2A becomes open, the switch unit SW2B becomes closed, the switch unit SW3A becomes open, and the switch unit SW3B becomes closed, and thus the resistors units 2051i, 2052i, and 2053 are connected in series between the supply voltage VREF and the ground level GND. Based on the respective resistance values R1i, R2i, R3, and the voltage dividing operation/principle, the ADC 110 can detect and obtain a first voltage difference between its differential input nodes ND1 and ND2 (e.g. a voltage drop V7 (not shown in FIG. 2) across the resistor unit 2052i of the resistor units 2051i, 2052i, and 2053) and the ADC 110 can correspondingly convert the first voltage difference into a first digital signal such as a digital code D7. The voltage drop V7 may be different from the voltage drop V5 mentioned above due to that a voltage variation occurs in the supply voltage VREF in this situation.

Then, after the first digital signal D7 is generated, the ADC 110 can control the switch units SW_i, SW_t, SW2A, SW2B, SW3A, and SW3B to make the processing circuit 205 operate in the second switching condition in which the switch unit SW_i becomes open, the switch unit SW_t becomes closed, the switch unit SW2A becomes closed, the switch unit SW2B becomes open, the switch unit SW3A becomes closed, the switch unit SW3B becomes open, and thus the resistors units 2051t, 2052t, and thermistor 101 become connected in series between the supply voltage VREF and the ground level GND. Based on the respective resistance values of the resistors units R1t, R2t, Rth, and the voltage dividing operation/principle, the ADC 110 can detect and obtain a second voltage difference between its differential input nodes ND1 and ND2 (e.g. a voltage drop V8 (not shown in FIG. 2) across the resistor unit 2052t of the resistor units 2051t, 2052t, and thermistor 101) and the ADC 110 can correspondingly convert the second voltage difference into a second digital signal such as a digital code D8.

After generating the second digital signal D8, the ADC 110 can accurately estimate the variable resistance value Rth of the thermistor based on the ratio change between the first and second digital signals D7 and D8 respectively corresponding to the voltage differences V7 and V8 even though a voltage variation, caused due to a significant temperature variation, may occur in the supply voltage VREF or VREF_adc. For example (but not limited), when a voltage variation occurs in the supply voltage VREF, this causes the same proportional voltage change occur in the voltage drop V7 corresponding to the first digital signal D7 and in the voltage drop V8 corresponding to the second digital signal D8. That is, the same proportional data change occurs in the first digital signal D7 and in the second digital signal D8. Thus, in this embodiment, regardless of the different voltage variations caused due to different working temperature values, the difference or ratio between the first and second digital signals D7 and D8 is not affected by the voltage variations, and it is associated with the ratio change between the resistance values Rth and R3 and thus can accurately reflect the actual resistance value Rth of the thermistor. Thus, according to the circuit design of processing circuit 205, the ADC 110 can accurately determine the resistance value Rth based on the ratio between the first and second digital signals D7 and D8 and the actual resistance value R3 of the resistor unit 2053. Similarly, after obtaining the actual resistance value Rth, the ADC 110 is arranged to obtain a variable working temperature associated with the estimated resistance value Rth based on the mapping table which records the relation between different variable working temperatures and different resistance values of the thermistor.

Figure 3:
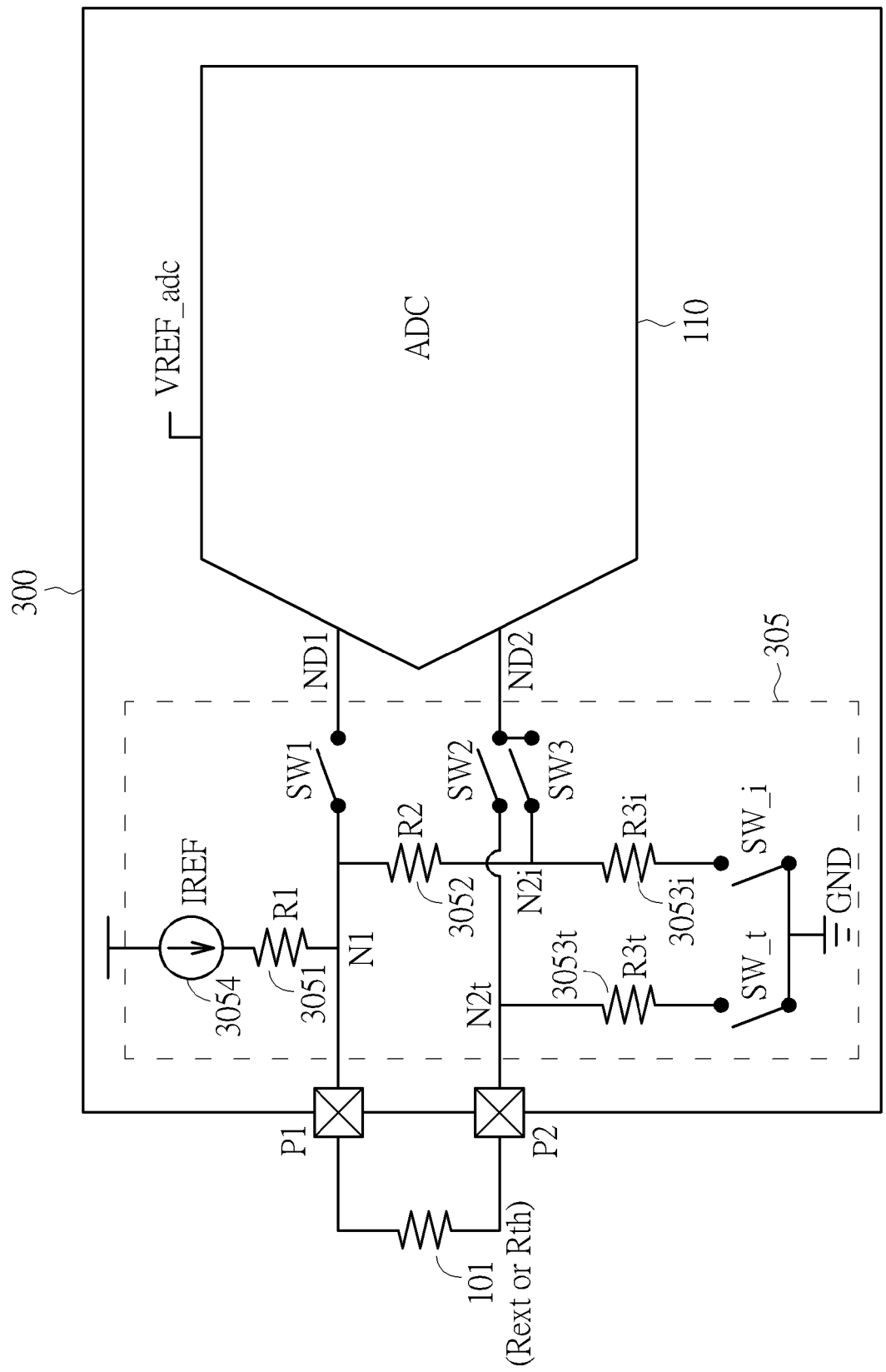
FIG. 3 is a circuit diagram of a readout circuit according to another embodiment of the invention.

In other embodiments, a readout circuit may operate in a current mode different from the above-mentioned voltage mode. An advantage of using the current mode is that the ADC 110 can be implemented easily by using a simplified circuit design; for instance, it may be not needed to implement a wider dynamic input range for the ADC 110. This is not intended to be a limitation. FIG. 3 is a circuit diagram of an electronic device such as readout circuit 300 according to another embodiment of the invention. The readout circuit 300 is arranged to operate in the current mode and comprises two signal ports such as two pins/pads P1 and P2 in FIG. 3, the ADC 110 such as HRADC, and a processing circuit 305 disposed between the pads P1 and P2 and the ADC 110. The readout circuit 300 is to be coupled to the external circuit component 101 through the two pads P1 and P2, wherein the external circuit component 101 for example is the reference resistor unit having a reference and accurate resistance value Rext or the thermistor having a variable resistance value Rth corresponding to a variable working temperature, as shown in FIG. 3. The processing circuit 305 comprises a reference current source 3054 used for generating and providing a reference current signal IREF from the supply voltage VREF to a resistor unit 3051, switch units SW1-SW3, resistor units 3051, 3052, 3053i, 3053t respectively having the resistance values R1, R2, R3i, R3t, and two switch units SW_i and SW_t.

The intermediate node N1 of the processing circuit 305 is coupled to the first differential input node ND1 of the ADC 110, and the intermediate nodes N2i and N2t of the processing circuit 305 are selectively coupled to the second differential input node ND2 of the ADC 110 through the switch units SW2 and SW3. The processing circuit 305 is powered by the reference voltage VREF, and the ADC 110 is powered by the reference voltage VREF_adc which may be identical to or different from the reference voltage VREF.

In this embodiment, similarly, to obtain the actual resistance or impedance of the internal circuit component(s) of the readout circuit 300 under a condition that the process variation has occurred, the readout circuit 300 before leaving the manufacturer's factory can be coupled to the reference resistor unit having the reference and accurate resistance value Rext. In this situation, the two pads P1 and P2 of readout circuit 300 are coupled to two ends of the external resistor unit 101 having the reference resistance value Rext. When the readout circuit 300 is coupled to the external resistor unit 101, the switch unit SW1 is controlled by the ADC 100 and becomes closed so that the processing circuit 305 can act as an intermediate readout circuit; the switch unit SW1 becomes open when the pads P1 and P2 are disconnected from the external circuit component 101. The reference current source 3054 is disposed and coupled between the supply voltage VREF and one end (i.e. the top end) of the resistor unit 3051 having the resistance value R1. The resistor unit 3051 having the resistance value R1 is disposed and coupled between the output of the reference current source 3054 and the intermediate node N1. The resistor unit 3052 having the resistance value R2 is disposed and coupled between the intermediate nodes N1 and N2i. The resistor unit 3053i having the resistance value R3i is disposed and coupled between the intermediate node N2i and one end (i.e. the top end) of the switch unit SW_i. The resistor unit 3053t having the resistance value R3t is disposed and coupled between the intermediate node N2t (coupled to the pad P2) and one end (i.e. the top end) of the switch unit SW_t. The switch unit SW_i is selectively coupled between the resistor unit 3053i and the ground level GND. The switch unit SW_t is selectively coupled between the resistor unit 3053t and the ground level GND.

To obtain the actual resistance or impedance of the internal circuit component (s) to reduce or remove the process variation effect, the processing circuit 105 operates in a first switching condition in which the switch unit SW_i becomes closed, the switch unit SW_t becomes open, the switch unit SW1 is closed, the switch unit SW2 becomes open, and the switch unit SW3 becomes closed. Thus, the resistors units 3051, 3052, and 3053i respectively having the resistance value R1, R2, and R3i are connected in series between the supply voltage VREF and the ground level GND, and the reference current signal IREF passes through the serially connected resistor units 3051, 3052, and 3053i.

Accordingly, the ADC 110 can detect and obtain a first voltage difference between its differential input nodes ND1 and ND2 (e.g. a voltage drop V9 (not shown in FIG. 3) across the resistor unit 3052 having the resistance value R2), and the ADC 110 can correspondingly convert the first voltage difference into a first digital signal such as a digital code D9.

Then, after the first digital signal D9 is generated, the ADC 110 can control the switch units SW2, SW3, SW_i, and SW_t to make the processing circuit 105 operate in a second switching condition in which the switch unit SW_i becomes open, the switch unit SW_t becomes closed, the switch unit SW1 is still closed, the switch unit SW2 becomes closed, and the switch unit SW3 becomes open. Thus, the resistors unit 3051, the external resistor unit 101, and the resistor unit 3053t respectively having the resistance value R1, Rext, and R3t become connected in series between the supply voltage VREF and the ground level GND, and the reference current signal IREF passes through the serially connected resistor units 3051, 101, and 3053t. The resistor unit 3053t for example is matched with and a duplicate of the resistor unit 3053i, and the resistance values R3i and R3t may be identical or may be different. Then, the ADC 110 can detect and obtain a second voltage difference between its differential input nodes ND1 and ND2 (e.g. a voltage drop V10 (not shown in FIG. 3) across the external resistor unit 101 having the resistance value Rext in the resistor units 3051, 101, and 3053t, and the ADC 110 can correspondingly convert the second voltage difference into a second digital signal such as a digital code D10.

After generating the second digital signal D10, the ADC 110 can accurately estimate the variation(s) of resistor units 3051, 3052, 3053i, and 3053t based on the first and second digital signals D9 and D10. For example (but not limited), the accurate reference resistance value Rext may be configured to be identical to the target resistance value of resistor unit 3052, and ideally the first voltage difference (or the first digital signal D9) should be identical to the second voltage difference (or the second digital signal D10) mentioned above. Thus, when detecting a variation between the first and second voltage differences (or between the first and second digital signals D9 and D10), the ADC 110 can obtain a resistance variation of the resistor unit 3052 based on the detected variation between the first and second digital signals D9 and D10 so as to obtain and determine/estimate the actual resistance value R2. It should be noted that, in other embodiments, the resistance value Rext of the reference resistor unit may be designed and configured to be different from the target resistance value of resistor unit 3052; this is not meant to be a limitation. Further, it should be noted that the ADC 110 is arranged to obtain the actual resistance value R2 of resistor unit 3052 and it is not needed for the ADC 110 to calibrate the actual resistance value R2 of resistor unit 3052 to the target resistance value. The resistor unit 3053t is matched with the resistor unit 3053i, and ideally they have the same process variation. Detecting signal twice to obtain a ratio or difference between two digital signals can correspondingly remove the process variation effect of resistor units 3053i and 3053t.

After the readout circuit 300 leaves the factory, the readout circuit 300 is to be coupled to two terminals of a thermistor circuit/unit which may operate at a wider temperate range in which a voltage variation may occur in the supply voltage (s) VREF and/or VREF_adc. Similarly, to reduce this effect, the readout circuit 300 is arranged to read and obtain two digital signals, i.e. reading signal two times. For example, the external circuit component 101 in this situation is the thermistor having the actual resistance value Rth corresponding to a variable working temperature. Similarly, the processing circuit 305 operates in a first switching condition in which the switch unit SW_i becomes closed, the switch unit SW1 is still closed, the switch unit SW2 becomes open, the switch unit SW3 becomes closed, and the switch unit SW_t becomes open. In this situation, the resistors units 3051, 3052, and 3053i become connected in series between the supply voltage VREF and the ground level GND, and the reference current signal IREF passes through the serially connected resistor units 3051, 3052, and 3053i. Accordingly, the ADC 110 can also detect and obtain a first voltage difference between its differential input nodes ND1 and ND2 (e.g. a voltage drop V11 (not shown in FIG. 3) across the resistor unit 3052 having the resistance value R2 in the resistor units 3051, 3052, and 3053i), and the ADC 110 can correspondingly convert the first voltage difference into a first digital signal such as a digital code D11.

Then, after the first digital signal D11 is generated, the ADC 110 can control the switch units SW_i, SW_t, SW2, and SW3 to make the processing circuit 305 operate in a second switching condition in which the switch unit SW_i becomes open, the switch unit SW1 is still closed, the switch unit SW2 becomes closed, the switch unit SW3 becomes open, and the switch unit SW_t becomes closed. In this situation, the resistors unit 3051, the thermistor 101, and the resistor unit 3053t respectively having the resistance value R1, Rth, and R3t become connected in series between the supply voltage VREF and the ground level GND, and the reference current signal IREF passes through the serially connected resistor unit 3051, thermistor 101, and resistor unit 3053t. The ADC 110 can detect and obtain a second voltage difference between its differential input nodes ND1 and ND2 (e.g. a voltage drop V12 (not shown in FIG. 3) across the thermistor 101 having the resistance value Rth), and the ADC 110 can correspondingly convert the second voltage difference into a second digital signal such as a digital code D12. Similarly, after generating the second digital signal D12, the ADC 110 can accurately estimate the resistance value Rth of the thermistor based on the ratio change between the first and second digital signals D11 and D12. After obtaining the resistance value Rth, the ADC 110 is arranged to estimate and obtain the variable working temperature associated with the estimated resistance value Rth based on the mapping table (e.g. a look-up table) which records the relation between different variable working temperatures and different resistance values of the thermistor.

Figure 4:
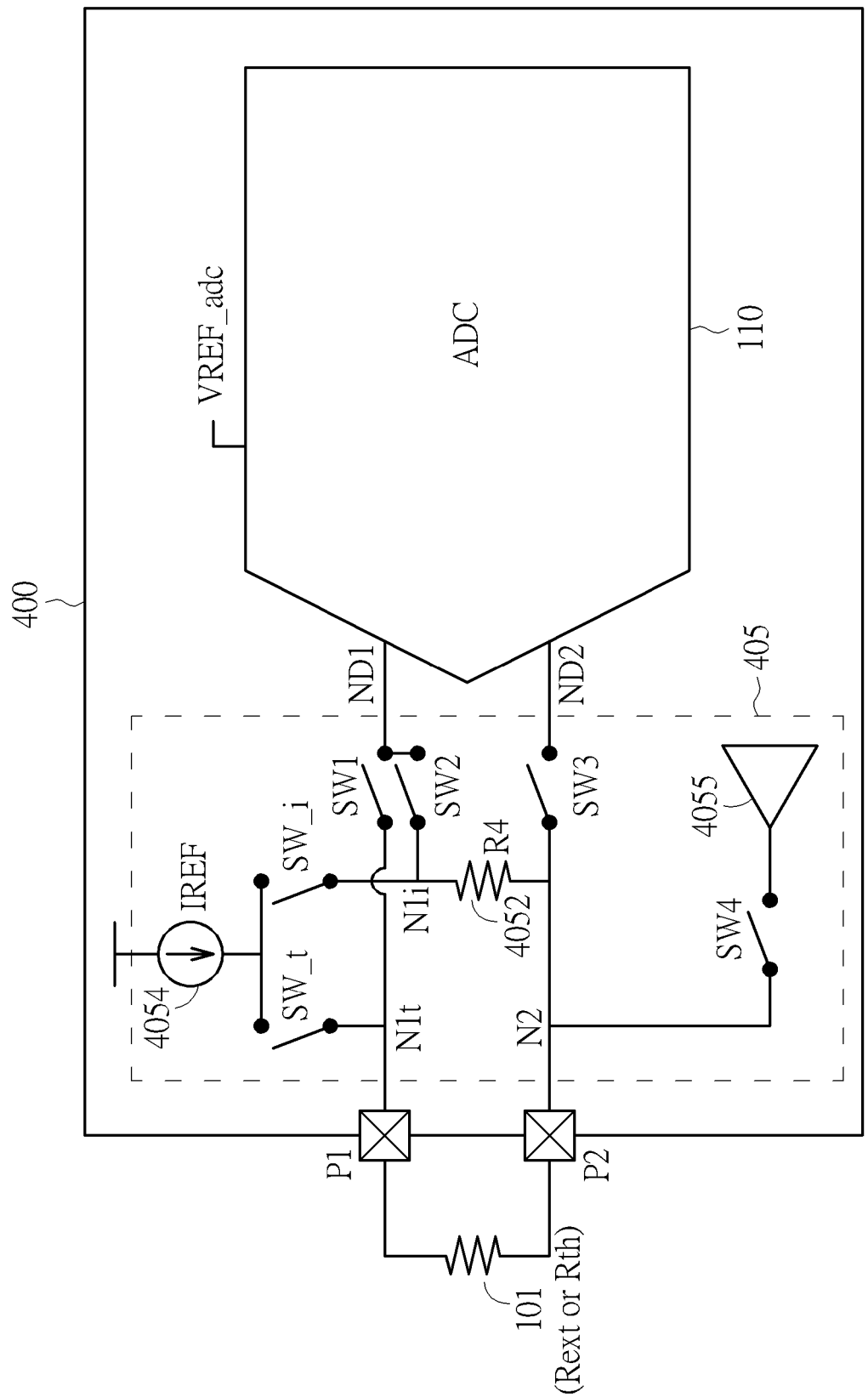
FIG. 4 is a circuit diagram of a readout circuit according to another embodiment of the invention.

In other embodiments, a portion of resistor units may be replaced by using a voltage buffer which provides a common mode voltage level. FIG. 4 is a circuit diagram of an electronic device such as readout circuit 400 according to another embodiment of the invention. The readout circuit 400 is arranged to operate in the current mode and comprises two signal ports such as two pins/pads P1 and P2 in FIG. 4, the ADC 110 such as HRADC, and a processing circuit 405 disposed between the pads P1 and P2 and the ADC 110. The readout circuit 400 is to be coupled to the external circuit component 101 through the two pads P1 and P2, wherein the external circuit component 101 for example is the reference resistor unit having the reference (or fixed) and accurate resistance value Rext or the thermistor having a variable resistance value Rth corresponding to a variable working temperature, as shown in FIG. 4. The processing circuit 405 comprises a reference current source 4054 used for generating and providing a reference current signal IREF, switch units SW_i and SW_t, a resistor unit 4052 having a resistance value R4, switch units SW1-SW4, and a voltage buffer circuit 4055.

The intermediate node N2 of the processing circuit 405 is selectively coupled to the differential input node ND2 of the ADC 110 through the switch unit SW3. The intermediate nodes N1i and N1t of the processing circuit 405 are selectively coupled to the differential input node ND1 of the ADC 110 through the switch units SW1 and SW2 shown in FIG. 4. The processing circuit 405 is powered by the reference voltage VREF, and the ADC 110 is powered by the reference voltage VREF_adc which may be identical to or different from the reference voltage VREF.

In this embodiment, to obtain the actual resistance or impedance of the internal circuit component (s) of the readout circuit 400 under a condition that the process variation has occurred, the readout circuit 400 before leaving the manufacturer's factory can be coupled to the reference resistor unit having the reference and accurate resistance value Rext. In this situation, the two pads P1 and P2 of readout circuit 400 are coupled to two ends of the external resistor unit 101 having the reference (or fixed) resistance value Rext. When the readout circuit 400 is coupled to the external resistor unit 101, the switch units SW3 and/or SW4 become closed, so that the processing circuit 405 can act as an intermediate readout circuit; the switch unit SW3 and/or SW4 become (s) open when the pads P1 and P2 are disconnected from the external resistor unit 101. The reference current source 4054 is disposed and coupled between the supply voltage VREF and one end (i.e. the top end) of the switch unit SW_i or SW_t. The switch unit SW_i is controlled by the ADC 110 and selectively coupled between the bottom end of the reference current source 4054 and the intermediate node N1i of processing circuit 405, and the switch unit SW_t is controlled by the ADC 110 and selectively coupled between the bottom end of the reference current source 4054 and the intermediate node N1t of processing circuit 405, i.e. coupled to the pad P1. The resistor unit 4052 having the resistance value R4 is disposed and coupled between the intermediate node N1i and the intermediate node N2 (i.e. coupled to the pad P2). The switch unit SW1 is controlled by the ADC 110 and selectively coupled between the differential input node ND1 and the intermediate node N1t, and the switch unit SW2 is controlled by the ADC 110 and selectively coupled between the differential input node ND1 and the intermediate node N1i. The switch unit SW3 is controlled by the ADC 110 and selectively coupled between the differential input node ND2 and the intermediate node N2. The voltage buffer circuit 4055 is used to providing and generating a common mode voltage level to the intermediate node N2 through the switch unit SW4.

To obtain the actual resistance or impedance of the internal circuit component (s) to reduce or remove the process variation effect, the external circuit component 101 in this situation is a reference resistor having the reference resistance value Rext, and the processing circuit 405 operates in a first switching condition in which the switch unit SW_i becomes closed, the switch unit SW_t becomes open, the switch unit SW1 becomes open, the switch unit SW2 becomes closed, and the switch units SW3 are SW4 are closed. The reference current signal IREF passes through the resistor unit 4052 having the resistance value R4, and accordingly the ADC 110 can detect and obtain a first voltage difference between its differential input nodes ND1 and ND2 (e.g. a voltage drop V13 (not shown in FIG. 4) across the resistor unit 4052 having the resistance value R4), and the ADC 110 can correspondingly convert the first voltage difference into a first digital signal such as a digital code D13.

Then, after the first digital signal D13 is generated, the ADC 110 can control the switch units SW1, SW2, SW_i, and SW_t to make the processing circuit 105 operate in a second switching condition in which the switch unit SW_i becomes open, the switch unit SW_t becomes closed, the switch unit SW1 becomes closed, the switch unit SW2 becomes open, and the switch units SW3 and SW4 are still closed. The reference current signal IREF passes through the external reference resistor 101 having the reference resistance value Rext, and accordingly the ADC 110 can detect and obtain a second voltage difference between its differential input nodes ND1 and ND2 (e.g. a voltage drop V14 (not shown in FIG. 4) across the resistor unit 101 having the reference resistance value Rext), and the ADC 110 can correspondingly convert the second voltage difference into a second digital signal such as a digital code D14.

After generating the second digital signal D14, the ADC 110 can accurately estimate the variation(s) of resistor unit 4052 based on the first and second digital signals. For example (but not limited), the accurate reference resistance value Rext may be configured to be identical to the target resistance value of resistor unit 4052, and ideally the first voltage difference (or the first digital signal D13) should be identical to the second voltage difference (or the second digital signal D14) mentioned above. Thus, when detecting a variation between the first and second voltage differences (or between the first and second digital signals D13 and D14), the ADC 110 can obtain a resistance variation of the resistor unit 4052 based on the detected variation between the first and second digital signals D13 and D14 so as to obtain and determine/estimate the actual resistance value R4.

After the readout circuit 400 leaves the factory, the readout circuit 400 is to be coupled to two terminals of a thermistor circuit/unit which may operate at a wider temperate range in which a voltage variation may occur in the supply voltage(s) VREF and/or VREF_adc. Similarly, to reduce this effect, the readout circuit 400 is arranged to read and obtain two digital signals, i.e. reading signal two times. For example, the external circuit component 101 in this situation is a thermistor having the actual resistance value Rth corresponding to a variable working temperature. Similarly, the processing circuit 405 operates in the first switching condition in which the switch unit SW_i becomes closed, the switch unit SW_t becomes open, the switch unit SW1 becomes open, the switch unit SW2 becomes closed, and the switch units SW3 and SW4 are still closed. In this situation, the reference current signal IREF passes through the resistor unit 4052 having the resistance value R4. Similarly, the ADC 110 can also detect and obtain a first voltage difference between its differential input nodes ND1 and ND2 (e.g. a voltage drop V15 (not shown in FIG. 4) across the resistor unit 4052 having the resistance value R4), and the ADC 110 can correspondingly convert the first voltage difference into a first digital signal such as a digital code D15. It should be noted that, in other embodiments, the voltage drop V15 and voltage drop V13 may not be affected by the voltage variation occurring in the supply voltage VREF since the reference current signal IREF may be fixed in different working temperature values, and the ADC 110 in FIG. 4 may convert the voltage drop V13 into the digital signal D13 to store such digital signal D13 before leaving the factory and then use the stored digital signal D13 as the resultant digital signal D15 of the voltage drop V15 without actually converting the voltage drop V15 into another digital signal after leaving the factory.

Then, after the above-mentioned first digital signal D15 is generated or obtained, the ADC 110 can control the switch units SW_i, SW_t, and SW1-SW4 to make the processing circuit 405 operate in a second switching condition in which the switch unit SW_i becomes open, the switch unit SW_t becomes closed, the switch unit SW1 becomes closed, the switch unit SW2 becomes open, and the switch units SW3 and SW4 are still closed. In this situation, the reference current signal IREF passes through the thermistor 101 having the variable resistance value Rth corresponding to a variable working temperature value. Accordingly, the ADC 110 can also detect and obtain a second voltage difference between its differential input nodes ND1 and ND2 (e.g. a voltage drop V16 (not shown in FIG. 4) across the thermistor 101), and the ADC 110 can correspondingly convert the second voltage difference into a second digital signal such as a digital code D16. Similarly, after generating the second digital signal D16, the ADC 110 can accurately estimate the variable resistance value Rth of the thermistor based on the ratio change between the first and second digital signals D15 and D16 respectively corresponding to the voltage drops V15 and 16. After obtaining the resistance value Rth, the ADC 110 is arranged to estimate and obtain the variable working temperature associated with the estimated resistance value Rth based on the mapping table which records the relation between different variable working temperatures and different resistance values of the thermistor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device for estimating a temperature value of a thermistor, comprising:
   a first signal port, to be coupled to a first terminal of the thermistor;
   a second signal port, to be coupled to a second terminal of the thermistor;
   an analog-to-digital converter; and
   a processing circuit, disposed and coupled between the first signal port and the analog-to-digital converter, the processing circuit comprising:
   a first resistor unit, coupled between a first intermediate node and a supply voltage provided for the processing circuit;
   a second resistor unit, coupled between the first intermediate node and a second intermediate node, the second intermediate node being coupled to the first signal port;
   a third resistor unit, coupled between the second intermediate node and a first switch unit;
   the first switch unit, coupled between the third resistor unit and a ground level; and
   a second switch unit, coupled between the second signal port and the ground level;
   wherein when the thermistor is coupled to the first signal port of the electronic device, the processing circuit is arranged to operate in a first switching condition to detect and generate a first voltage difference to the analog-to-digital converter, to operate in a second switching condition to detect and generate a second voltage difference to the analog-to-digital converter; the analog-to-digital converter is arranged to determine a resistance value of the thermistor based on the first voltage difference compared to the second voltage difference and to generate the estimated temperature value according to the determined resistance value; the first voltage difference is generated by the processing circuit in the first switching condition in which the first switch unit becomes closed and the second switch unit becomes open; the second voltage difference is generated by the processing circuit in the second switching condition in which the first switch unit becomes open and the second switch unit becomes closed; before being coupled to the thermistor, the first signal port and the second signal port are selectively coupled to two terminals of a reference resistor unit having a reference resistance value for estimating a process variation, and the processing circuit is arranged to detect and generate another first voltage difference to the analog-to-digital converter when the processing circuit operates in the first switching condition, to detect and generate another second voltage difference to the analog-to-digital converter when the processing circuit operates in the second switching condition; and, the analog-to-digital converter is arranged to determine a variation of a resistor unit comprised within the processing circuit according to the another first voltage difference and the another second voltage difference.

2. The electronic device of claim 1, wherein the processing circuit in two different switching conditions is used as an intermediate readout circuit to generate the first voltage difference and the second voltage difference into the analog-to-digital converter, and the analog-to-digital converter is arranged to convert the first voltage difference and the second voltage difference into a first digital signal and a second digital signal and to determine the resistance value of the thermistor based on a ratio between the first digital signal and the second digital signal.

3. An electronic device for estimating a temperature value of a thermistor, comprising:
a first signal port, to be coupled to a first terminal of the thermistor;
an analog-to-digital converter; and
a processing circuit, disposed and coupled between the first signal port and the analog-to-digital converter, and the processing circuit comprises:
a first switch unit, coupled between a first resistor unit and a supply voltage provided for the processing circuit;
the first resistor unit, coupled between the first switch unit and a first intermediate node which is selectively coupled to a first differential input node of the analog-to-digital converter;
a second resistor unit, coupled between the first intermediate node and a second intermediate node which is coupled to a second differential input node of the analog-to-digital converter;
a third resistor unit, coupled between the second resistor unit and a ground level;
a second switch unit, coupled between the supply voltage and a fourth resistor unit;
a fourth resistor unit, coupled between the second switch unit and a third intermediate node which is selectively to the first differential input node of the analog-to-digital converter;
a fifth resistor unit, coupled between the third intermediate node and a fourth intermediate node which is coupled to the first signal port and selectively coupled to the second differential input node of the analog-to-digital converter;
wherein when the thermistor is coupled to the first signal port of the electronic device, the processing circuit is arranged to operate in a first switching condition to detect and generate a first voltage difference to the analog-to-digital converter, to operate in a second switching condition to detect and generate a second voltage difference to the analog-to-digital converter; and, the analog-to-digital converter is arranged to determine a resistance value of the thermistor based on the first voltage difference compared to the second voltage difference and to generate the estimated temperature value according to the determined resistance value; the first voltage difference is generated by the processing circuit in the first switching condition in which the first switch unit becomes closed and the second switch unit becomes open; and, the second voltage difference is generated by the processing circuit in the second switching condition in which the first switch unit becomes open and the second switch unit becomes closed.

4. The electronic device of claim 3, wherein before being coupled to the thermistor, only the first signal port is selectively coupled to one terminal of a reference resistor unit having a reference resistance value for estimating a process variation, and the processing circuit is arranged to detect and generate another first voltage difference to the analog-to-digital converter when the processing circuit operates in the first switching condition, to detect and generate another second voltage difference to the analog-to-digital converter when the processing circuit operates in the second switching condition; and, the analog-to-digital converter is arranged to determine a variation of a resistor unit comprised within the processing circuit according to the another first voltage difference and the another second voltage difference.

5. The electronic device of claim 3, wherein the fourth resistor unit is a duplicate of the first resistor unit, and the fifth resistor unit is a duplicate of the second resistor unit.

6. An electronic device for estimating a temperature value of a thermistor, comprising:
a first signal port, to be coupled to a first terminal of the thermistor;
a second signal port, to be coupled to a second terminal of the thermistor;
an analog-to-digital converter; and
a processing circuit, disposed and coupled between the first signal port and the analog-to-digital converter, and the processing circuit operates in a current mode and comprises:
a current source, coupled between a first resistor unit and a supply voltage provided for the processing circuit;
the first resistor unit, coupled between the current source and a first intermediate node which is coupled to the first signal port and selectively coupled to a first differential input node of the analog-to-digital converter;
a second resistor unit, coupled between the first intermediate node and a second intermediate node which is coupled to a third resistor unit and selectively coupled to a second differential input node of the analog-to-digital converter;
the third resistor unit, coupled between the third intermediate node and a first switch unit;

the first switch unit, selectively coupled between the third resistor unit and a ground level;

a fourth resistor unit, coupled between a second switch unit and a third intermediate node which is coupled to the second signal port;

the second switch unit, selectively coupled between the fourth resistor unit and the ground level;

wherein when the thermistor is coupled to the first signal port of the electronic device, the processing circuit is arranged to operate in a first switching condition to detect and generate a first voltage difference to the analog-to-digital converter, to operate in a second switching condition to detect and generate a second voltage difference to the analog-to-digital converter; and, the analog-to-digital converter is arranged to determine a resistance value of the thermistor based on the first voltage difference compared to the second voltage difference and to generate the estimated temperature value according to the determined resistance value; the first voltage difference is detected by the processing circuit when operates in the first switching condition in which the first switch unit becomes closed, the second switch unit becomes open, and the current source provides a reference current signal flowing through the second resistor unit; and, the second voltage difference is detected by the processing circuit when operates in the second switching condition in which the first switch unit becomes open, the second switch unit becomes closed, and the reference current signal is arranged to flow through the thermistor.

7. The electronic device of claim 6, wherein before being coupled to the thermistor, the first signal port and the second signal port are selectively coupled to two terminals of a reference resistor unit having a reference resistance value for estimating a process variation, and the processing circuit is arranged to detect and generate another first voltage difference to the analog-to-digital converter when the processing circuit operates in the first switching condition, to detect and generate another second voltage difference to the analog-to-digital converter when the processing circuit operates in the second switching condition; and, the analog-to-digital converter is arranged to determine a variation of a resistor unit comprised within the processing circuit according to the another first voltage difference and the another second voltage difference.

8. The electronic device of claim 6, wherein the fourth resistor unit is a duplicate of the third resistor unit.

9. An electronic device for estimating a temperature value of a thermistor, comprising:
a first signal port, to be coupled to a first terminal of the thermistor;
a second signal port, to be coupled to a second terminal of the thermistor;
an analog-to-digital converter; and
a processing circuit, disposed and coupled between the first signal port and the analog-to-digital converter, and the processing circuit operates in a current mode and comprises:
a current source, coupled to a supply voltage provided for the processing circuit and selectively coupled to a first switch unit and a second switch unit;
the first switch unit, selectively coupled between the current source and a first intermediate node which is selectively coupled to a first differential input node of the analog-to-digital converter;

the second switch unit, selectively coupled between the current source and a second intermediate node which is coupled to the first signal port and selectively coupled to the first differential input node of the analog-to-digital converter;

a first resistor unit, coupled between the first switch unit and a third intermediate node which is coupled to the second signal port and selectively coupled to a second differential input node of the analog-to-digital converter;

a voltage buffer circuit, coupled to the third intermediate node, for providing a common mode voltage level to the third intermediate node;

wherein when the thermistor is coupled to the first signal port of the electronic device, the processing circuit is arranged to operate in a first switching condition to detect and generate a first voltage difference to the analog-to-digital converter, to operate in a second switching condition to detect and generate a second voltage difference to the analog-to-digital converter; and, the analog-to-digital converter is arranged to determine a resistance value of the thermistor based on the first voltage difference compared to the second voltage difference and to generate the estimated temperature value according to the determined resistance value; the first voltage difference is detected by the processing circuit when operates in the first switching condition in which the first switch unit becomes closed, the second switch unit becomes open, and a reference current signal provided by the current source flows through the first resistor unit; and, the second voltage difference is detected by the processing circuit when operates in the second switching condition in which the first switch unit becomes open, the second switch unit becomes closed, and the reference current signal is arranged to flow through the thermistor.

10. The electronic device of claim 9, wherein one end of the thermistor and one end of the first resistor unit are coupled to the common mode voltage level.

11. The electronic device of claim 9, wherein before being coupled to the thermistor, the first signal port and the second signal port are selectively coupled to two terminals of a reference resistor unit having a reference resistance value for estimating a process variation, and the processing circuit is arranged to detect and generate another first voltage difference to the analog-to-digital converter when the processing circuit operates in the first switching condition, to detect and generate another second voltage difference to the analog-to-digital converter when the processing circuit operates in the second switching condition; and, the analog-to-digital converter is arranged to determine a variation of a resistor unit comprised within the processing circuit according to the another first voltage difference and the another second voltage difference.

12. A method of an electronic device for estimating a temperature value of a thermistor, comprising:
providing a first signal port, to be coupled to a first terminal of the thermistor;
providing an analog-to-digital converter;
providing a processing circuit, disposed and coupled between the first signal port and the analog-to-digital converter;
when the thermistor is coupled to the first signal port of the electronic device, controlling the processing circuit to operate in a first switching condition to detect and generate a first voltage difference to the analog-todigital converter, to operate in a second switching condition to detect and generate a second voltage difference to the analog-to-digital converter;

using the analog-to-digital converter to determine a resistance value of the thermistor based on the first voltage difference compared to the second voltage difference and to generate the estimated temperature value according to the determined resistance value;

before the electronic device is coupled to the thermistor, controlling the first signal port and a second signal port of the electronic device be selectively coupled to two terminals of a reference resistor unit having a reference resistance value for estimating a process variation;

using the processing circuit to detect and generate another first voltage difference to the analog-to-digital converter when the processing circuit operates in the first switching condition, to detect and generate another second voltage difference to the analog-to-digital converter when the processing circuit operates in the second switching condition; and using the analog-to-digital converter to determine a variation of a resistor unit comprised within the processing circuit according to the another first voltage difference and the another second voltage difference.

13. The method of claim 12, wherein the step of using the analog-to-digital converter further comprises:

converting the first voltage difference and the second voltage difference into a first digital signal and a second digital signal; and determining the resistance value of the thermistor based on a ratio between the first digital signal and the second digital signal.

14. A method of an electronic device for estimating a temperature value of a thermistor, comprising:

providing a first signal port, to be coupled to a first terminal of the thermistor;

providing an analog-to-digital converter;

providing a processing circuit, disposed and coupled between the first signal port and the analog-to-digital converter;

when the thermistor is coupled to the first signal port of the electronic device, controlling the processing circuit to operate in a first switching condition to detect and generate a first voltage difference to the analog-to-digital converter, to operate in a second switching condition to detect and generate a second voltage difference to the analog-to-digital converter;

using the analog-to-digital converter to determine a resistance value of the thermistor based on the first voltage difference compared to the second voltage difference and to generate the estimated temperature value according to the determined resistance value;

before the electronic device is coupled to the thermistor, controlling only the first signal port of the electronic device be selectively coupled to one terminal of a reference resistor unit having a reference resistance value for estimating a process variation;

using the processing circuit to detect and generate another first voltage difference to the analog-to-digital converter when the processing circuit operates in the first switching condition, to detect and generate another second voltage difference to the analog-to-digital converter when the processing circuit operates in the second switching condition; and using the analog-to-digital converter to determine a variation of a resistor unit comprised within the processing circuit according to the another first voltage difference and the another second voltage difference.

* * * * *